United States Patent [19]
Wanka

[11] Patent Number: 4,596,988
[45] Date of Patent: Jun. 24, 1986

[54] REMOTE CONTROLLED TRACKING TRANSMITTER AND TRACKING SUPPORT SYSTEM

[76] Inventor: James T. Wanka, 148-23 Booth Memorial Ave., Flushing, N.Y. 11355

[21] Appl. No.: 503,240

[22] Filed: Jun. 10, 1983

[51] Int. Cl.⁴ .......................... G01S 3/02; H04B 1/02
[52] U.S. Cl. ...................................... 343/457; 455/92
[58] Field of Search .................. 343/457, 353; 455/92

[56] References Cited
U.S. PATENT DOCUMENTS

| | | | |
|---|---|---|---|
| 2,922,142 | 5/1957 | Lappin | 455/92 |
| 3,018,475 | 1/1962 | Kleist et al. | 455/92 |
| 3,058,106 | 10/1962 | Cutler | 343/353 |
| 3,357,020 | 12/1967 | Slifer | 343/457 |
| 3,518,674 | 6/1970 | Moorehead et al. | 343/457 |

Primary Examiner—Theodore M. Blum
Assistant Examiner—David C. Cain
Attorney, Agent, or Firm—Richard L. Miller

[57] ABSTRACT

A tracking system which when interrogated automatically reports data corresponding to the location of an unknown missing respondent, and thus permits one to find the location of an article stolen or high jacked such as an automobile, truck, van, boat, airplane or any other inanimate object which might have been either stolen or accidentally misplaced.

8 Claims, 3 Drawing Figures

REMOTE CONTROLLED TRACKING TRANSMITTER AND TRACKING SUPPORT SYSTEM

BACKGROUND OF THE INVENTION

The present invention relates to a tracking system which when interrogated automatically reports data corresponding to the location of an unknown respondent. At the present time there is not any practical system which permits one to find the location of an article stolen or high jacked such as an automobile, truck, van, boat airplane or any other inanimate object which might have been either stolen or accidentally misplaced.

In todays large cities a car can be stolen and dismembered by professional car thieves in such a short length of time that even though the owner and the police are aware that the vehicle has vanished efforts to recover such a stolen vehicle are almost futile because the thieves quickly hide the vehicle and rapidly dismember it before a proper search effort can be organized. In addition such a search at best is difficult because of the vast available hiding places thieves might take advantages of for their illegal acts.

Similar problems exist for other types of vehicles whether they be ship, aircraft, or land travelling in nature, and whether the motive for stealing or hijacking be for capturing the vehicle it self or the cargo contained there within. At best this situation is disconcerting, and in want of an improvement and to this end the present invention offers a solution for quickly locating and tracking a missing vehicle without the thieves even being aware that they have been located.

It is noted that numerous devices and systems have been provided in prior art that are adapted to locate or implement an alarm warning in various situations. For example, U.S. Pat. Nos. 4,101,873, 4,187,497 and 4,247,846 all are illustrative of such prior art. While these units may be suitable for the particular purpose to which they address, they would not be as suitable for the purposes of the present invention as heretofore described.

SUMMARY OF THE INVENTION

A principle object of the present invention is to provide an automatic tracking system which when interrogated will report data corresponding to the location of a missing vehicle in which a tracking receiver and transmitter has been previously installed.

Another object is to provide a system in which the majority of the equipment is available as off the shelf components, and there for for the most part, only require that these components be properly selected and interconnected in order to accomplish the task at hand.

Still a further object is to provide a system which will automatically plot the location on a map plotting board to locate at a central base station the whereabouts of a missing vehicle.

A still further object is to provide a system which can be accessed by a user via a telephone call.

Yet an additional object of the system is to provide data about the location of several missing vehicles all at the same time so that each individual missing vehicle's location can be plotted and tracked separately and distinctly from all others.

Yet a still further object is to provide a system whereby an independent mobile search vehicle such as a helicopter can be supplied a transmission signal from the system upon which it can fix a bearing.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DESCRIPTION OF THE PREFERRED EMBODIMENTS

Figure 1:
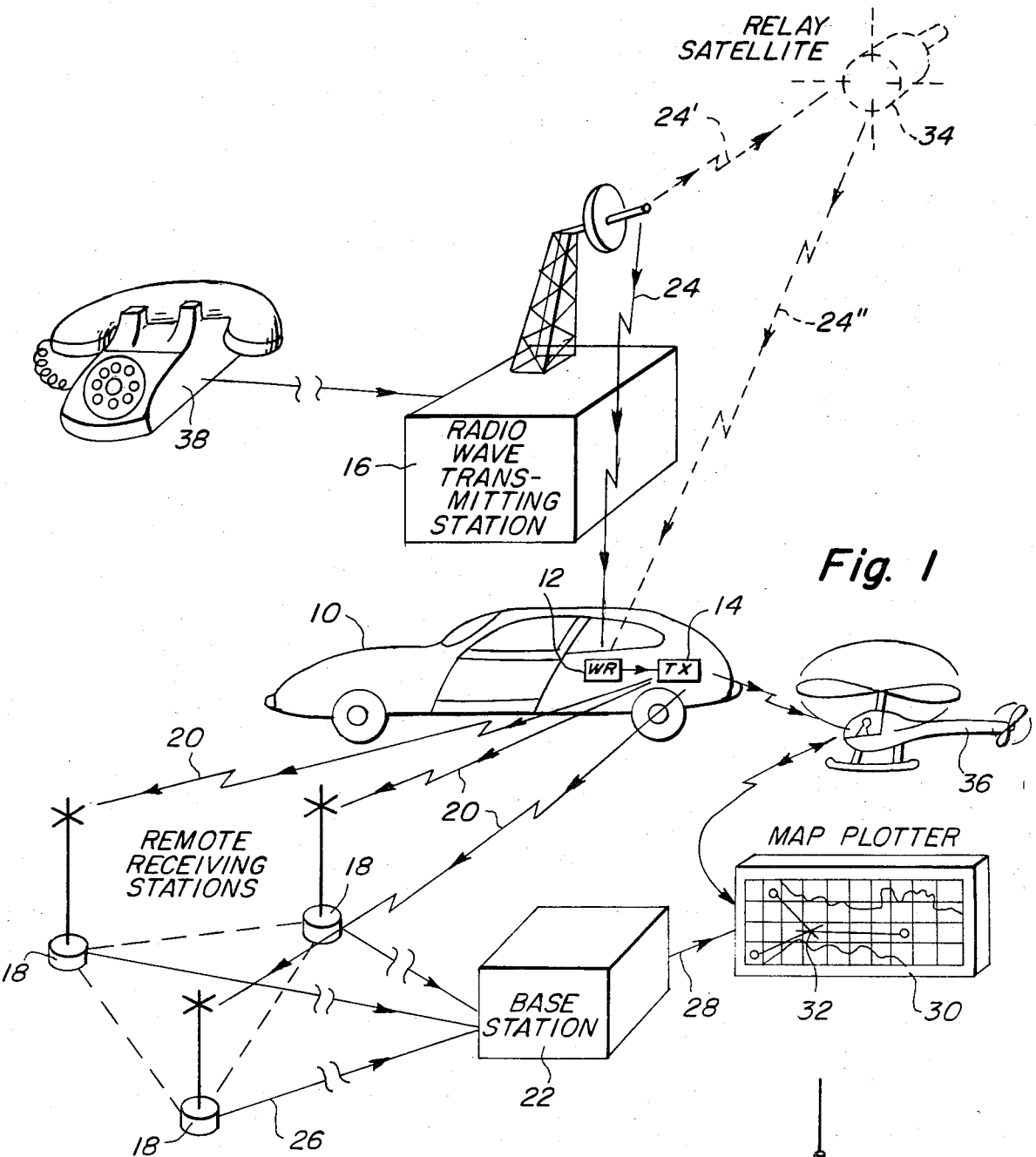
FIG. 1 is a diagrammatic perspective view illustrating the operation of the invention when being utilized to locate and track a typical vehicle.
Figure 2:
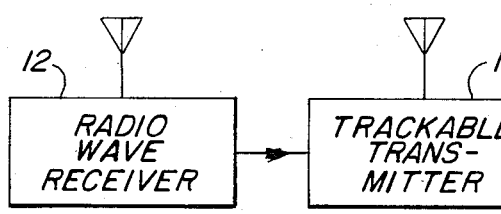
FIG. 2 is a block diagram of the remote controlled transmitter component of the system.
Figure 3:
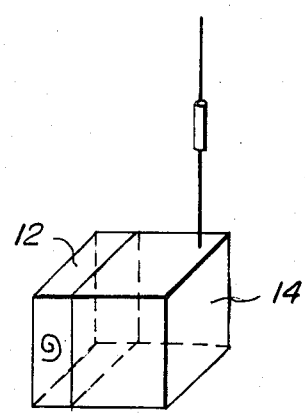
FIG. 3 is a perspective view of a typical embodiment of the remote controlled transmitter component of the system.

Turning now descriptively to the drawings, in which similar reference characters denote similar elements throughout the several views, FIGS. 1 through 3 illustrates a typical remote controlled tracking transmitter and tracking support system, in which 10 denotes an automobile which is being automatically tracked by the system illustrated in FIG. 1.

Within the automobile 10 is mounted preferably in a concealed hidden location a combination radio wave receiver 12 logically coupled to a trackable transmitter 14. The radio wave receiver's sole purpose is to activate and deactivate the trackable transmitter upon receiving the proper transmission signal 24 from a remote powerful transmitting source such as a transmitting station 16. For the purpose of this specification it is to be understood that the words "radio wave" are to be broadly interpreted to mean any electromagnetic wave ranging from kilo cycles up into the microwave range.

When the trackable transmitter 14 is radiating a signal 20 this signal is automatically received by a network of remote receiving stations 18, of which three are illustrated.

The remote receiving stations 18 all typically contain an Automatic Direction Finder (ADF), a Remote Telecommunication Interface (RTI), a MODEM, and a Data Coupler, all of which is off the shelf components (available from Ocean Applied Research, a division of General Indicator Corporation). The network of receiving stations 18 each typically receive the signal 20 and automatically determine the bearing relative to the location of the individual receiving station, and transmit this bearing information via the MODEM, and Data Coupler over ordinary telephone lines 26 to a corresponding Data Coupler, and MODEM contained at the base station 22.

The base station 22 typically also contains a microprocessor-based computer, to automatically process the bearing information and send the appropriate signals 28 to a map plotter 30 corresponding to the location 32 of the missing vehicle 10.

While the basic system has been illustrated there are some subtle refinements which should be elaborated upon. In order that the system be able to keep track of more than one vehicle at a time it is desirable that each vehicle 10, which has a trackable transmitter 14, should send out it own unique signal 20. That is each should be encoded so that it is distinguishable from preferably all other signals. This is well within the state of the art and may be accomplished by any number of various methods of encodement. By way of example the signal may be amplitude modulated, or frequency modulated each with a particular train of digital pulses representing a binary number from 0 to 4096 and this is strictly a matter of design choice.

It is also highly desirable that each radio wave receiver 12, require an activating and deactivating signal 24, which is uniquely distinguishable from all other activating and deactivating transmissions. Again this may be accomplished by similar well known state of the art methods of encoding.

With reference to the above refinements a single computer can keep track of the data for several vehicles at one time and plot any single one on one map plotter at a time or simultaneously several on several map plotter at the same time.

It should also be noted that a map plotter is in reality a luxury which is unnecessary as coordinate location data for any individual vehicle can be printed out on a line printer and continuously up dated when and as often as required.

There is are three basic variations in the mode in which the trackable transmitter of this system can be designed to operate which are a matter of choice and are as follows:

(1) Probably the simplest design is to require one character of signal 24, to activate the trackable transmitter 14, and a second character of signal 24 to deactivate the trackable transmitter 14.

(2) A another method is to require that a continuous signal 24 be required to keep trackable transmitter activated, in this system the trackable transmitter can act as a transponder returning a signal every time it is interrogated.

(3) The third and most sophisticated design is to construct the transmitter so that a signal with a particular character or signature will switch the transmitter from mode 1 to mode 2.

Although not necessary it is desirable that transmission station 16, and base station 22 be preferable at the same location and if this is not the case than at least a communication link of some kind is necessary, either voice or MODEM, so that transmissions signal 24, can be correlated with data 28 for more positive identification if desired or required.

Telephone 38 is illustrative of such a communication link and is located at base station 22, where the operator in this situation would place a phone call to the operator of transmitting station 16 implementing the the starting or stoping of signal 24 as may be required when the base station 22, and transmitting station 16, are separate and distinct.

By way of a most rudimentary example radio receiver 12 could for instants be designed to operate when sensing a $(30 \times 10^6)$ cps carrier signal wave frequency modulated with a particular tone pitch of 1050 cps 24, and simply close a set of contacts turning on trackable transmitter 14, which would than radiate a $(440 \times 10^6)$ cps carrier wave with an amplitude modulated frequency of 850 cps 20.

Depending on the global coverage required by the system radio wave station 16 might instead transmit a signal 24' to a relay satellite 34, which in turn would then transmit a microwave signal 24" to be detected by receiver 12.

An additional characteristic of the system is that a helicopter 36, or some other mobile vehicle can home in on signal 20 and relay additional bearing information to the system base station until visual contact can be confirmed.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A remote controlled tracking transmitter and tracking support system comprising:
   (a) a combination radio wave receiver and trackable transmitter to be mounted in a vehicle to be tracked such that a first signal received by said radio wave receiver activates said trackable transmitter so that a second signal is thereby transmitted by said trackable transmitter, said trackable transmitter having a first mode of operation wherein said first signal received by said radio wave receiver is required to be continuously present in order to maintain said trackable transmitter in an activated state to produce said second signal, and a second mode of operation wherein a third signal is required for receipt by said receiver to deactivate said trackable transmitter, and a fourth signal received by said radio wave receiver to switch the mode of said trackable transmitter;
   (b) a radio wave transmitting source for transmitting first, third and fourth signals to said radio wave receiver; and
   (c) means for remotely detecting said second signal to determine the location of said trackable transmitter when said trackable transmitter is transmitting said second signal.

2. A remote controlled tracking transmitter and tracking support system as recited in claim 1, wherein said first signal and said second signal are distinguished from each other and are each encoded so as to be each distinguishable from other first and second signals of other said combination radio wave receivers and trackable transmitters.

3. A remote controlled tracking transmitter and tracking support system as recited in claim 1, wherein said radio wave transmitting source for transmitting said first signal is a ground based transmitting station able to transmit at least one signal at a time encoded so as to be distinguishable by only a corresponding specific said radio wave receiver.

4. A remote controlled tracking transmitter and tracking support system as recited in claim 3, wherein said first signal is relayed from said ground based transmitting station to a satellite so as to be retransmitted to said radio wave receiver.

5. A remote controlled tracking transmitter and tracking support system as recited in claim 1, wherein said means for detecting the location of said trackable transmitter is a network of at least two remote receiving stations, and means for communicating data to a base station equipped with a microprocessor computer for interpreting said data.

6. A remote controlled tracking transmitter and tracking support system as recited in claim 5, wherein said at least two remote receiving stations, further each comprise an Automatic Direction Finder, a Remote Telecommunication Interface, a MODEM, and a Data Coupler.

7. A remote controlled tracking transmitter and tracking support system as recited in claim 5, wherein said base station is further equipped with one data coupler and one MODEM for each said remote receiving station.

8. A remote controlled tracking transmitter and tracking support system as recited in claim 5, wherein a base station, and a radio wave transmitting source for transmitting said first signals to said radio wave receiver are both housed at the same location.

* * * * *